March 20, 1945. J. E. OPGENORTH 2,372,113
ELECTRODE HOLDER
Filed Aug. 28, 1943 2 Sheets-Sheet 1
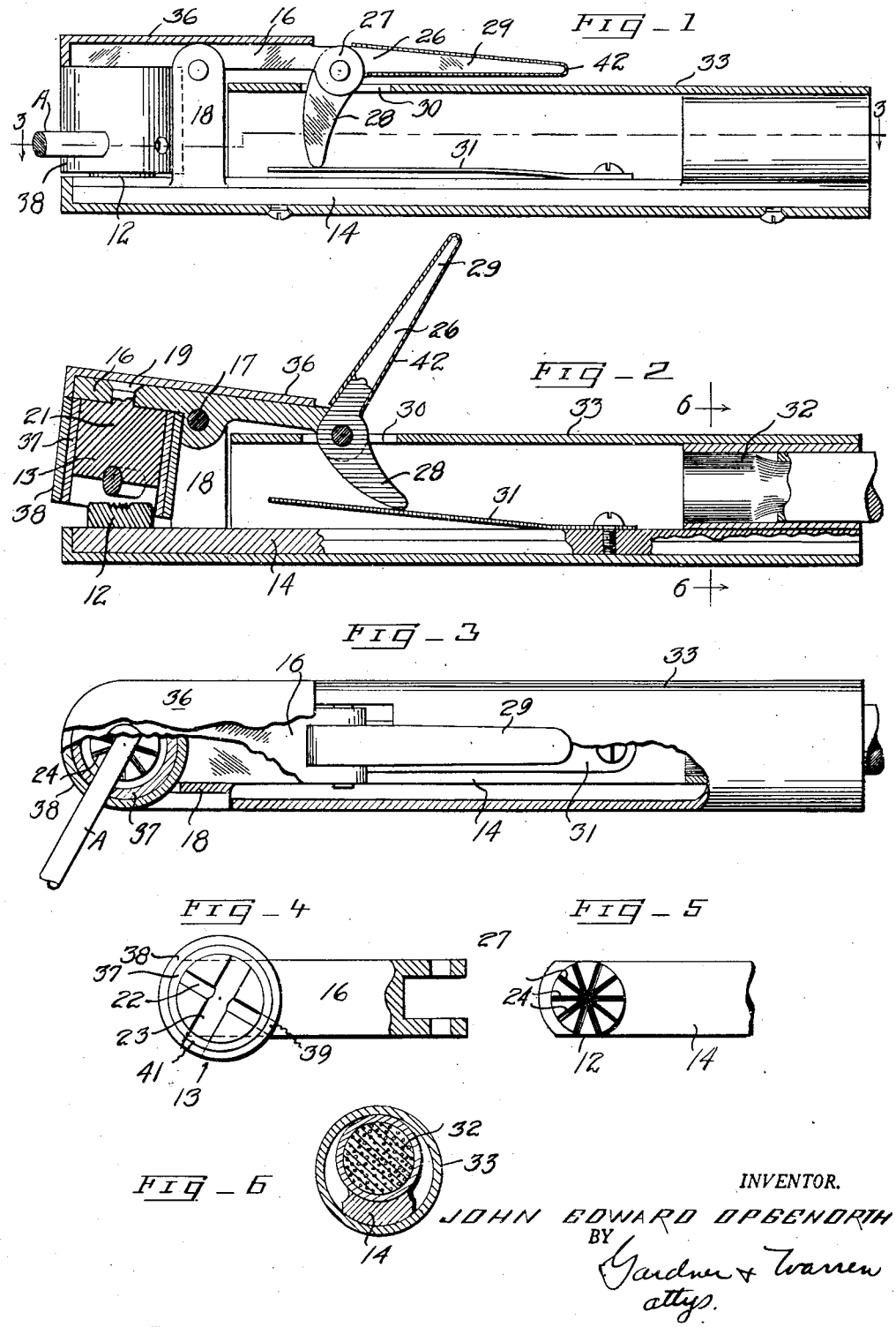
INVENTOR.
JOHN EDWARD OPGENORTH
BY Gardner + Warren
attys.

March 20, 1945.  J. E. OPGENORTH  2,372,113
ELECTRODE HOLDER
Filed Aug. 28, 1943  2 Sheets-Sheet 2
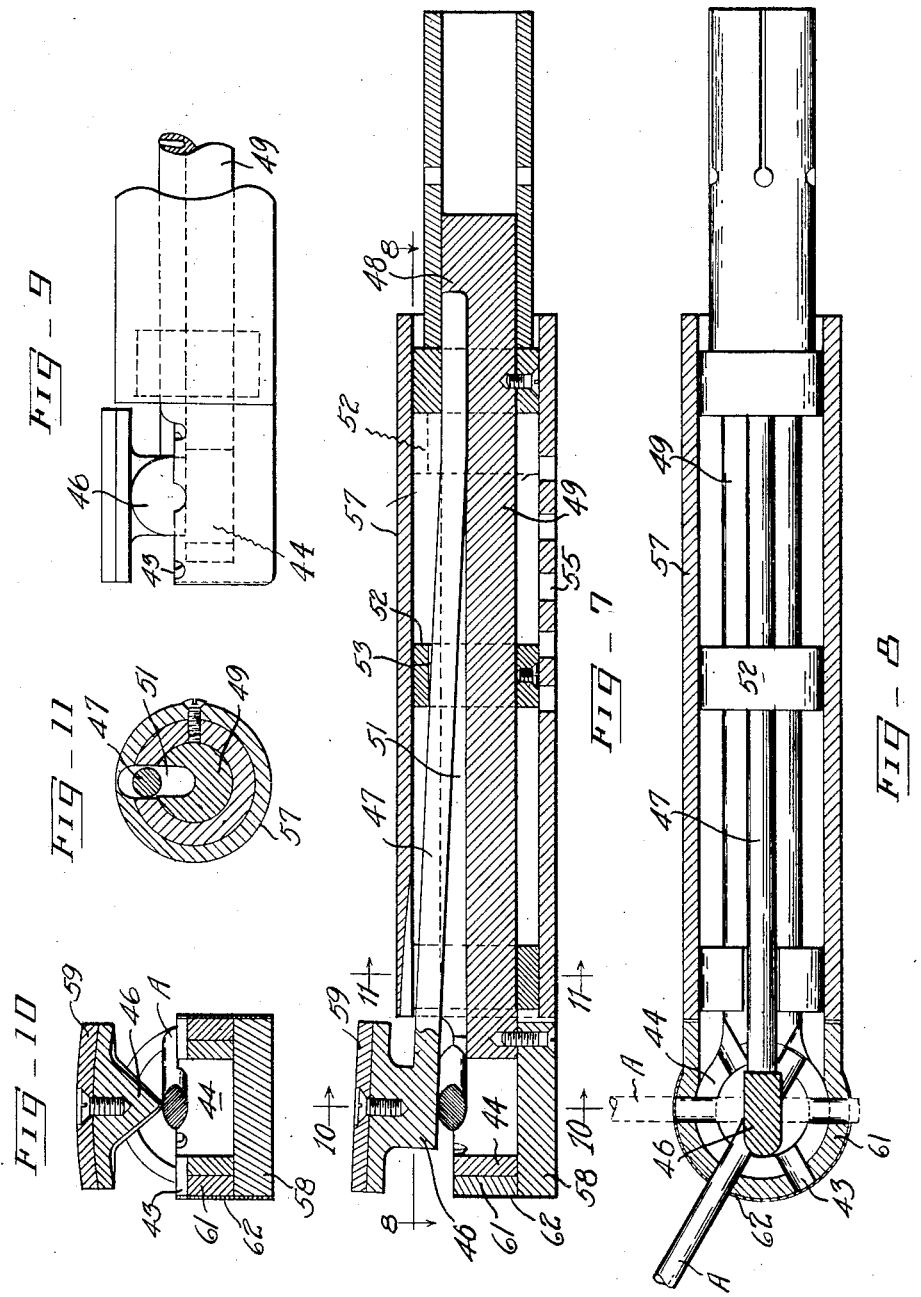
INVENTOR
JOHN EDWARD OPGENORTH
BY Gardner & Warren
his attys.

Patented Mar. 20, 1945

2,372,113

UNITED STATES PATENT OFFICE 2,372,113

ELECTRODE HOLDER

John Edward Opgenorth, Oakland, Calif.

Application August 28, 1943, Serial No. 500,345

5 Claims. (Cl. 219—8)

The invention relates to an electrode holder and particularly to the type designed to be held in the hand of the operator in performing a welding operation.

An object of the invention is to provide a holder of the character described in which the electrode or welding rod may be held in any desired angular position on the holder without the necessity of bending or otherwise deforming the rod.

Another object of the invention is to provide a holder of the character described in which the position of the rod may be changed without requiring the removal of the rod from the holder or any loosening and retightening operations or entailing any impairment of the grip upon the rod when the adjustment has been made.

A further object of the invention is to provide a holder of the character described which will be completely insulated and protected to prevent the accumulation of slag on the exterior of the holder or entry thereof to the interior working parts of the holder.

A still further object of the invention is to provide a holder which will be extremely rugged in construction, and will permit the almost complete use or burning of the rods without injuring the holder parts and insulation.

Yet another object of the invention is to provide a holder which will permit the quick and easy insertion or removal of the welding rod and which may be used with a wide range of different sizes of rod.

The invention possesses other objects and features of advantage, some of which with the foregoing, will be set forth in the following description of the preferred form of the invention which is illustrated in the drawings forming and accompanying part of the specification. It is to be understood, however, that variations in the showing made by the said drawings and description may be adopted within the scope of the invention as set forth in the claims.

Referring to said drawings:

Figure 1 is a side view of the holder with the housing in section and with a welding rod operatively held therein.

Figure 2 is a view similar to Figure 1 but showing the parts in longitudinal section and with the welding rod released.

Figure 3 is a plan view of the holder as shown in Figure 1 but with parts removed and shown in section, as on the line 3—3 of Figure 1.

Figure 4 is a bottom view of one of the welding rod gripping jaws.

Figure 5 is a plan view of a portion of the complementary rod gripping jaw of the holder.

Figure 6 is a transverse sectional view of the holder taken on the line 6—6 of Figure 2.

Figure 7 is a longitudinal sectional view taken through a holder of a modified form.

Figure 8 is a longitudinal sectional view of the holder shown in Figure 7, the plan of the section being indicated by the line 8—8 of Figure 7.

Figure 9 is a fragmentary side elevation of the gripping end of the holder shown in Figure 7.

Figures 10 and 11 are transverse sectional views of the holder taken on the lines 10—10 and 11—11 of Figure 7.

The holder, in the preferred form of the invention which is illustrated in Figures 1 to 6 inclusive, comprises a set of jaws 12 and 13 between which a welding rod A is arranged to be gripped. The jaw 12 is relatively stationary and is fixedly mounted on a support 14, extending longitudinally of the holder, while the jaw 13 is arranged for movement relative to the jaw 12 and is carried by an arm 16 which is pivoted such as by a pin 17 to posts 18 preferably formed as extensions of the support 14. Movement of the jaw 13 about the pivot 17 is to and from the jaw 12 so that the rod A may be gripped or released between the jaws.

Jaw 13 in addition to being movable about the pivot 17 is mounted for rotation on the arm 16 about an axis at right angles to the axis of pivot 17, the jaw 13 being supported for such rotation by means of a stud 19 which is preferably rotatable in the arm and fixed to the body 21 of the jaw. The under side of the body 21 is formed with a plurality of grooves 22 and 23 in which the welding rod is arranged to be seated and held in place when the jaws are brought together. Since the jaw 13 is rotatable the latter may be moved so as to present the grooves and correspondingly the welding rod in various rotational relationships with respect to the longitudinal axis of the holder, and preferably the coacting face of the jaw 12 is formed with a plurality of intersecting grooves or notches 24 in which the welding rod may be seated in different rotational positions of the jaw 13, the intersecting point of the notches 24 preferably being such that when the jaws are brought together with the rod therebetween the axis of rotation of the jaw 13 will generally coincide with such point. In this manner the welding rod may be held in the grooves or notches of both jaws and thus with a relatively small force inserted to hold the jaws together, the rod will be firmly held in desired position. In this connection it will be noted that the grooves 24 in the fixed jaw are relatively numerous so that the rod may be held in a considerable number of different angular relations. As will be clear from Figure 4 the grooves 22 and 23 in the under side of the movable jaw are of different size so as to readily accommodate different diameters of welding rod.

Movement of the arm 16 for the purpose of clamping the rod in position between the jaws and for holding the jaws apart to permit the gripping or releasing of the rod, is here shown arranged to be effected by means of a lever 26 which is pivotally connected to one end 27 of the arm. The lever 26 is formed with arms 28 and 29 and in such relation that when the arm 29 is depressed to the position shown in Figure 1 the jaw 13 will have moved to the jaw 12, and conversely when the arm 29 is moved to the elevated position shown in Figure 2 the jaw 13 will be released for positioning away from jaw 12. Arm 28 is designed for coaction with a relatively fixed part of the holder or as here shown such arm is designed to engage a spring 31 fixed to the support 14, the arm being moved to an overcenter position so as to resiliently lock the movable jaw in a gripping position. Likewise the resilient engagement of the arm 28 and the spring 31 will cause the welding rod to be clamped in position with a resilient force thus relieving the holder of strain and avoiding possible mutilation of the rod.

Electrical connection is made with the support 14 by means of an electric conductor 32, and in order to insulate such support and the conductor the holder is provided with a casing 33 of insulating material and as will be clear from the drawings the casing is formed with an opening 30 for the accommodation of the lever 26. The casing is also cut away adjacent the movable jaw including a portion of arm 16, and preferably a covering 36 is provided on the arm 16 and a shell 37 is enclosed about the jaw body 21. As will be clear from Figure 2 the shell 37 depends below the body 21 so that not only the movable jaw but the fixed jaw will be enclosed with an insulation when the jaws are held together. Furthermore as an important feature of my invention a shell 38 of copper or the like is fitted around the insulation shell 37 in order that no welding slag can accumulate on the shell 37 or between the jaws within the holder during the welding operation. Perforations 39 and 41 are formed in the shells 37 and 38 in registration with the grooves 22 and 23 so as to permit the welding rod to be inserted in position in the movable jaw. Preferably an insulation covering 42 is provided around the lever arm 29 which is disposed exteriorly of casing 33. For operatively positioning a welding rod in the holder, the lever 26 is positioned as in Figure 2 for releasing the jaw 13, and a welding rod is inserted within such jaw through the opening 39 or 41 depending on the diameter of the rod. The rod is inserted so that its rear end will substantially abut the closed side of the shell 37, and it will be noted that the rod will be thus held in a supported position although the jaws are still separated. The lever arm 29 is then depressed to force the jaws together and with the rod firmly gripped and held in the opposed grooves and notches, the arm 28 being advanced overcenter to lock the parts in position. The jaw 13 is then rotated against the resistance of spring 31 to place the rod in desired angular relation and in the appropriate notch 24. Should it be desired to reposition or change the angle of the rod, it is merely necessary to rotate the jaw 13 to desired position, the spring 31 again permitting the raising of the arm 16 without the necessity of releasing lever 26. To remove the rod, it is simply necessary to raise the arm 29 to release the rod from engagement with the fixed jaw and then extract the rod through the opening 39 or 41 as the case may be. In case the rod is allowed to remain in the holder until the former is consumed up to the opening in the copper shell 38, the stub may be extracted by releasing the jaw 13 and then simply tilting the holder so as to allow the stub to drop out, it being noted in this connection that the openings 39 and 41 are made slightly larger than the rods so as to avoid any binding. It is important to note that due to the provision of the copper shell 38, not only is the insulation 37 protected from the entry of slag, but the rod may be allowed to be consumed up to the copper shell without danger of impairing the insulation.

In Figures 7 and 11 inclusive I have shown a somewhat modified form of the invention. In this embodiment the welding rod is held in any one of the notches 43 in the jaw 44 by a movable but non-rotatable cooperating jaw 46. The latter is supported by a spring arm 47 which is anchored in the base portion 48 of a longitudinally extending support 49, in the head portion of which is provided the fixed jaw. The movable jaw 46 is guided for movement to and from the fixed jaw in a slot 51 formed in the support 49. The spring mounting of the jaw 46 urges such jaw towards the jaw 44 and in this manner when a welding rod is seated in one of the notches 43, the jaw 46 will engage the rod and hold it against the fixed jaw. Preferably a sleeve 52 is slidably fitted over the support 49 so that it may be moved longitudinally thereon. An opening 53 in the sleeve is engaged by the spring arm 47 so that by moving the sleeve longitudinally the jaw 46 may be caused to bear against the rod with greater or lesser force. As will be understood, when the sleeve 52 is retracted to a rear position such as shown in dotted lines in Figure 7 the tension on the rod is at a minimum, thus permitting the jaw 46 to be raised by the operator so as to allow for the ready extraction of the rod or its repositioning into another set of notches 43 as may be desired.

Preferably the portion of the jaw 46 arranged to engage the rod is formed V-shaped so as to permit a more effective engagement with the rod and hold it in position against the fixed jaw 44. As in the case of the first described embodiment a tube 57 of insulating material is provided to enclose the support 49 and the arm 47 and serve as a handle for the holder. The tube 57 is formed with openings 55 through which an appropriate tool may be inserted for moving the sleeve 52. Insulation strips 58 and 59 are provided on the exposed sides of the jaws 44 and 46 respectively, and preferably a shell 62 of copper is provided around the insulation 61 for the reason previously explained.

I claim:

1. In a welding electrode holder, an elongated support, a jaw fixedly carried on said support and having a plurality of radially arranged and extending notches formed for the reception of the side of an electrode rod, an arm pivotally carried by said support, a jaw rotatably mounted on said arm for movement to and from said fixed jaw and having grooves arranged radially of the axis of rotation of the jaw and formed for supporting said rod in opposed relation to the notches in said fixed jaw, and insulating shield disposed over and around and depending from said second jaw, having openings therein in substantial alignment with said grooves, the axis of rotation of said second jaw being in substantial registration with the radial center of the grooves in said fixed jaw and whereby upon rotation of said second jaw, the rod disposed in the grooves thereof may be positioned to engage in different radial notches of the fixed jaw a lever connected to said arm, and a spring secured to said support arranged for engagement by said lever to resiliently force said jaws together and resiliently lock said jaws in operative relation, whereby said jaws are completely covered by said shield.

2. In a welding electrode holder, an elongated support, a jaw fixedly carried on said support and having a plurality of radially arranged and extending notches formed for the reception of the side of an electrode rod, an arm pivotally carried by said support, a jaw rotatably mounted on said arm for movement to and from said fixed jaw and having grooves arranged radially of the axis of rotation of the jaw and formed for supporting said rod in opposed relation to the notches in said fixed jaw, the axis of rotation of said second jaw being in substantial registration with the radial center of the grooves in said fixed jaw and whereby upon rotation of said second jaw, the rod disposed in the grooves thereof may be positioned to engage in different radial notches of the fixed jaw a lever connected to said arm, a spring secured to said support arranged for engagement by said lever to resiliently force said jaws together and resiliently lock said jaws in operative relation, an electrical conductor connected to said support, a casing of insulating material enclosing said support, a covering of insulation material on said arm, a shell of insulating material enclosing said rotatable jaw, having openings in substantial alignment with said grooves, and having an extension positioned to enclose said fixed jaw when the jaws are operatively engaged with the electrode clamp therebetween, and a shell of copper enclosing said insulating shell.

3. In a welding electrode holder, a support, a pair of jaws carried thereby and with one of the jaws arranged for movement relative to the other to receive and clamp a welding rod therebetween, a shell of insulating material fixed to and enclosing one of said jaws and having an imperforate extension positioned to enclose the other jaw when the two jaws are held together with the electrode clamped therebetween.

4. In a welding electrode holder, a support, a pair of jaws carried thereby and with one of the jaws arranged for movement relative to the other to receive and clamp a welding rod therebetween, a shell of copper fixed to and enclosing one of said jaws and having an extension positioned to enclose the other jaw and substantially engage said support when the two jaws are held together with the electrode clamped therebetween.

5. In a welding electrode holder, a support, a fixed jaw carried thereon, an arm pivotally carried on said support, a jaw carried by said arm for movement to and from said fixed jaw, a cam pivotally attached to said arm, a resilient pressure member bearing against said cam to urge said arm into engaged or disengaged position relative to said fixed jaw, and an imperforate shield disposed around and depending from said second jaw arranged to substantially engage said support and enclose said fixed jaw when the jaws are in engaged position.

JOHN EDWARD OPGENORTH.